(12) United States Patent
Mercuri et al.

(10) Patent No.: US 11,076,607 B2
(45) Date of Patent: Aug. 3, 2021

(54) DOUBLE TUBE ENCASING APPARATUS

(71) Applicant: Merctech Pty Ltd, Holden Hill (AU)

(72) Inventors: Ennio Mercuri, Holden Hill (AU);
James Mercuri, Holden Hill (AU);
Anthony Mendo, Holden Hill (AU)

(73) Assignee: Merctech Pty Ltd, Holden Hill (AU)

( * ) Notice: Subject to any disclaimer, the term of this patent is extended or adjusted under 35 U.S.C. 154(b) by 613 days.

(21) Appl. No.: 15/764,010

(22) PCT Filed: Sep. 28, 2016

(86) PCT No.: PCT/AU2016/000333
§ 371 (c)(1),
(2) Date: Mar. 28, 2018

(87) PCT Pub. No.: WO2017/054029
PCT Pub. Date: Apr. 6, 2017

(65) Prior Publication Data
US 2018/0271106 A1    Sep. 27, 2018

(30) Foreign Application Priority Data

Sep. 28, 2015 (AU) ................................ 2015903937

(51) Int. Cl.
*A22C 11/00* (2006.01)
*A22C 11/02* (2006.01)

(52) U.S. Cl.
CPC ...... *A22C 11/0209* (2013.01); *A22C 11/0227* (2013.01)

(58) Field of Classification Search
CPC . A22C 11/02; A22C 11/0209; A22C 11/0227; A22C 11/0236

USPC .......... 452/21–26, 30–32, 35–37, 46–48, 51
See application file for complete search history.

(56) References Cited

U.S. PATENT DOCUMENTS

| 4,470,171 | A |   | 9/1984  | Rusmussen et al. |
|-----------|---|---|---------|------------------|
| 4,525,895 | A | * | 7/1985  | Raudys ............. A22C 11/0281 |
|           |   |   |         | 138/118.1 |
| 4,734,956 | A |   | 4/1988  | Frey et al. |
| 4,993,210 | A |   | 2/1991  | Kollross |
| 5,024,041 | A |   | 6/1991  | Urban et al. |
| 5,980,374 | A |   | 11/1999 | Mercuri |
| 7,063,610 | B2 |  | 6/2006  | Mysker |
| 7,247,539 | B2 |  | 7/2007  | Kinoshita |

(Continued)

FOREIGN PATENT DOCUMENTS

EP    1378170 B1    8/2006

OTHER PUBLICATIONS

International Search Report and Written Opinion dated Nov. 23, 2016 in corresponding Application No. PCT/AU2016/000333; 11 pgs.

*Primary Examiner* — Richard T Price, Jr.
(74) *Attorney, Agent, or Firm* — Maier & Maier, PLLC

(57) ABSTRACT

A double tube encasing apparatus and methods of encasing for encasing meat products in a double casing including a film (e.g. collagen film) and a net in which a first tube is loaded with a height reduced shirred film and a second coaxial tube which supports a shirred netting. In one embodiment a casing tube is placed over a meat stuffing horn and is preloaded with a loose shirred film. A second casing tube which supports the netting is pushed or placed over the loose shirred film, and causes a reduction in diameter of the loose shirred film for example by forcing the vertically pleated shirred film to layback.

21 Claims, 7 Drawing Sheets

(56) References Cited

U.S. PATENT DOCUMENTS

| | | | |
|---|---|---|---|
| 7,494,405 B2 | 2/2009 | Arias Lopez |
| 7,537,514 B2 | 5/2009 | Arias Lopez |
| 7,687,122 B2 | 3/2010 | Huckfeldt |
| 7,883,399 B2 | 2/2011 | Tallberg et al. |
| 8,226,457 B2 | 7/2012 | Hihnala et al. |

* cited by examiner

DOUBLE TUBE ENCASING APPARATUS

PRIORITY DOCUMENTS

The present application claims priority from Australian Provisional Patent Application No. 2015903937 titled "A DOUBLE TUBE ENCASING APPARATUS" and filed on 28 Sep. 2015, the content of which is hereby incorporated by reference in its entirety.

TECHNICAL FIELD

The present invention relates to an apparatus for encasings meat products with a double film and netting casing.

BACKGROUND

Meat products, such as salamis, hams, poultry, turkeys and sausages are often encased in double casings comprising a film and a net. The encasing, or stuffing process comprises pushing the meat product through a meat stuffing horn, and applying a double casing over the meat. The double casing comprises an inner film with an outer netting. The inner film layer is primarily used to contain the meat and give it a desired shape (e.g. a sausage shape) as well as assisting to protect and preserve the meat, and may be edible or inedible. For example the film may be edible or inedible collagen films, fibrous casing, carrageenan films, cellulose films, paper films, polyamide films, polysaccharide films, synthetic films, or a close knit woven fabric or mesh film. The outer netting may be rigid or elastic and typically applies compressive force on the meat to assist in curing and/or preservation of the meat (e.g. by forcing out any air), to apply a surface pattern to the meat to give it a desirable appearance, or to act as a mechanical a strength enhancer to the film casing to ensure it does not burst or rip during filling, cooking or hanging of the meat product.

Typically the netting is stored and shipped in a loose unstretched form. In preparation for use, the netting is shirred (or rucked) onto a casing tube so that the netting is arranged in tight folds or pleats on the casing tube. The diameter of the casing tube is slightly larger than the diameter of the meat stuffing horn so that the casing tube can be inserted over and supported by the meat stuffing horn. In use as the meat is extruded the net is pulled off the casing tube (de-shirred) so that it expands and encases the meat. Shirring the net allows a large length of net to be loaded onto the fixed length casing tube. When the tube runs out of netting the stuffing machine must be stopped or paused whilst a new (preshirred) casing tube is loaded. Thus the netting is typically tightly packed to maximise the time between stoppages. Typically shirring of the netting onto the casing tube is performed shortly (i.e. minutes or hours) before use to minimise the time (or duration) that the netting is kept in a stretched form prior to use, as storage of the netting in stretched configuration tends to reduce its performance in use around a meat product. The size of the tube is limited by the maximum diameter of the rigid netting or maximum stretched diameter for elastic netting. As a point of clarity, the term shirring is used to mean both shirring and rucking. Shirring is the term typically used for casings, and rucking is the term used for nettings. Both refer to pleating of the casing/netting to a compressed or compact form for unshirring/unrucking onto the meat product. For the sake of convenience we will use the term shirring to cover both shirring and rucking.

Shirring arrangements are efficient for netting arrangements. However some films, and in particular collagen films, are fragile and thus difficult to apply using shirring arrangements. This creates problems with providing double casings, as rough treatment can lead to tearing of the collagen film as it is placed over the meat resulting in wastage of collagen, film, netting, meat product, and operator time.

In one arrangement the collagen is manufactured and stored as a tightly shirred roll. The shirred collagen roll is then placed onto the meat stuffing horn, and netting is shirred onto a casing tube that is placed over the first tube. As the meat is extruded from the meat stuffing horn, it is then double cased by the collagen on the meat stuffing horn and the netting on the casing tube. However due to the large shirred height of the collagen tube, this double tube arrangement requires that the second casing tube onto which the netting is shirred must have a large diameter. However this large diameter only allows use with large diameter nettings, limiting more widespread use of double tube arrangements for smaller meat products. For example, in many cases it is desirable to use a netting to apply a surface pattern to the meat product such as squares/checkerboard, rectangles, diamonds, hexagons, etc. Typically, though not necessarily elastic nettings are used (either in one or both of the radial and longitudinal directions) and the diameter of the netting is preferably less than the diameter of the casing so that the netting will apply compressive force so the meat product bulges out in the openings between netting members. However if the diameter of the inner casing is large, due to the large shirred height of the collagen or similar film, then this prevents the use of smaller diameter nettings, reducing the ability to produce surface patterning. For example in surface patterning or indenting applications, the netting may need to be 5-30% smaller in diameter than the casing to produce the desired indentation and patterning. However this is not possible with standard shirring methods for small diameter meat products (e.g. 60-160 mm).

Another arrangement used to double case a meat product as it is extruded is to use a flat collagen film stored on a roll and a means for shaping and wrapping the film around the meat stuffing horn as the meat is extruded through the meat stuffing horn. Shirred netting on a casing tube is placed over the meat stuffing horn and shaping and wrapping means, so that the wrapped meat is then encased with the netting to double case the meat product. The diameter of the collagen as the meat is extruded is similar to the diameter of the meat horn and thus the collagen is required to radially expand as it wraps and encases the meat. One method to facilitate this radial expansion is to introduce longitudinal folds or pleats in the collagen. As meat is extruded this pressure pushes the folds outward allowing radial expansion to an expanded diameter (i.e. the collagen has a reduced diameter on the horn or tube and expands to some nominal maximum diameter). However one problem with the use of longitudinal folds is that collagen is delicate and can be sticky (especially when wet), and so that as the folds expand to increase the radius, the two sides of a fold can catch on each other preventing free expansion of the fold. In this case pressure mounts on the fold from the filling of meat, leading to tearing of the delicate collagen film. This creates wastage of the collagen, film, netting, meat, and operator time.

There is thus a need to provide an improved apparatus for encasing meat products in a double casing comprising a film and a net, or to at least to provide a useful alternative to current arrangements.

SUMMARY

According to a first aspect, there is provided an encasing apparatus for encasing meat products extruded from a meat stuffing horn having a meat outlet end in a double casing comprising a film casing and a net casing, the encasing apparatus comprising:

a first casing tube for co-axial mounting over the meat stuffing horn for supporting a shirred film wherein the shirred film has a height reduced profile with a first height;

a second casing tube for co-axially mounting over the first casing tube for supporting a rucked net casing.

In one form, the shirred film is shirred onto the first casing tube with a curved over profile comprising a substantially vertical portion and a curved over portion, such that the height of the shirred film is reduced compared to the height if the film was substantially vertically shirred.

In one form, the film is shirred onto the first casing tube with a first height, and in use, placement of the second casing tube over the first casing tube induces a reduction in the height of the shirred film to a second height. In a further form, wherein the first casing tube has a first diameter, and the second casing tube has a second diameter, and the difference between the second diameter and the first diameter is less than the first height of the shirred film.

In one form, the film is a collagen film.

In one form, the portion of the meat stuffing horn that receives the first casing tube has a constant diameter.

In one form, the meat stuffing horn is the first casing tube.

In one form, the first casing tube has a first end and a casing outlet end and the encasing apparatus further comprises a mounting arrangement for co-axially mounting the first casing tube over the meat stuffing horn, the mounting arrangement comprising:

a first annular spacer for supporting the first casing tube from the meat stuffing tube at the first end of the casing tube, the first annular spacing comprising a support portion that supports and spaces the casing tube from the meat stuffing horn, and a stop portion extending radially from the support portion to act as a stop when inserting the casing tube over the meat stuffing horn;

a second annular spacer for supporting the first casing tube from the meat stuffing tube at the casing outlet end of the casing tube.

In one form, the first casing tube has a diameter in the range 40 mm to 100 mm and the second casing tube has a diameter in the range of 60 mm to 160 mm.

In one form, a diameter of the film is between 5%-30% smaller than a diameter of the netting.

In one form, the length of the shirred film casing is approximately an integer multiple of the length of the shirred netting.

In one form, the length of the shirred film casing is in the range of 1% times an integer multiple of the length of the shirred netting to 10% time an integer multiple of the length of the shirred netting.

According to a second aspect, there is provided a method of double casing a meat product exiting a meat stuffing horn, the method comprising:

loading a shirred film casing onto a first casing tube having a first height;

placing a second casing tube loaded with a shirred netting coaxially over the first casing tube;

forcing a meat product through the meat stuffing horn and double casing the meat exiting the meat stuffing horn by de-shirring the film and netting exiting the first casing tube and the second casing tube, wherein either the film casing is shirred to have a height reduced profile, or placing the second casing tube over the first casing tube induces a reduction in the height of the shirred film to a second height.

In one form, the step of loading a shirred film casing onto a first casing tube comprises:

shirring a film casing directly onto the first casing tube, or shirring the film casing onto a mandrel and loading the shirred film casing onto the first casing;

placing the first casing tube loaded with the shirred film over a meat stuffing horn having a first diameter.

In one form, the film casing is shirred with a height reduced profile compared to the height if the film was substantially vertically shirred. In a further form, wherein the shirred film has a substantially vertical portion followed by a curved over portion.

In one form, the step of placing a second casing tube over the first casing tube comprises sliding the second casing tube over the first casing tube from a casing outlet end towards a first end and the sliding action deflects at least an outer portion of the shirred film towards the first end to force the shirred film to adopt a laid back configuration.

In one form, the meat stuffing horn is the first casing tube and the step of loading a shirred film casing onto a first casing tube comprises:

obtaining a shirred film casing; and placing the shirred film over a meat stuffing horn having a first diameter.

In one form, the method comprises the further step of replacing the second casing tube with an additional second casing tube loaded with shirred netting. In a further form, the replacement step is performed when the second casing tube runs out of shirred netting, or is about to run out of shirred netting.

In one form, the first casing tube has a diameter in the range 40 mm to 100 mm and the second casing tube has a diameter in the range of 60 mm to 160 mm.

In one form, a diameter of the film is between 5%-30% smaller than a diameter of the netting.

In one form, the length of the shirred film casing is approximately an integer multiple of the length of the shirred netting. In one form, the length of the shirred film casing is in the range of 1% times an integer multiple of the length of the shirred netting to 10% time an integer multiple of the length of the shirred netting.

In one form, the film is a collagen film.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1A:
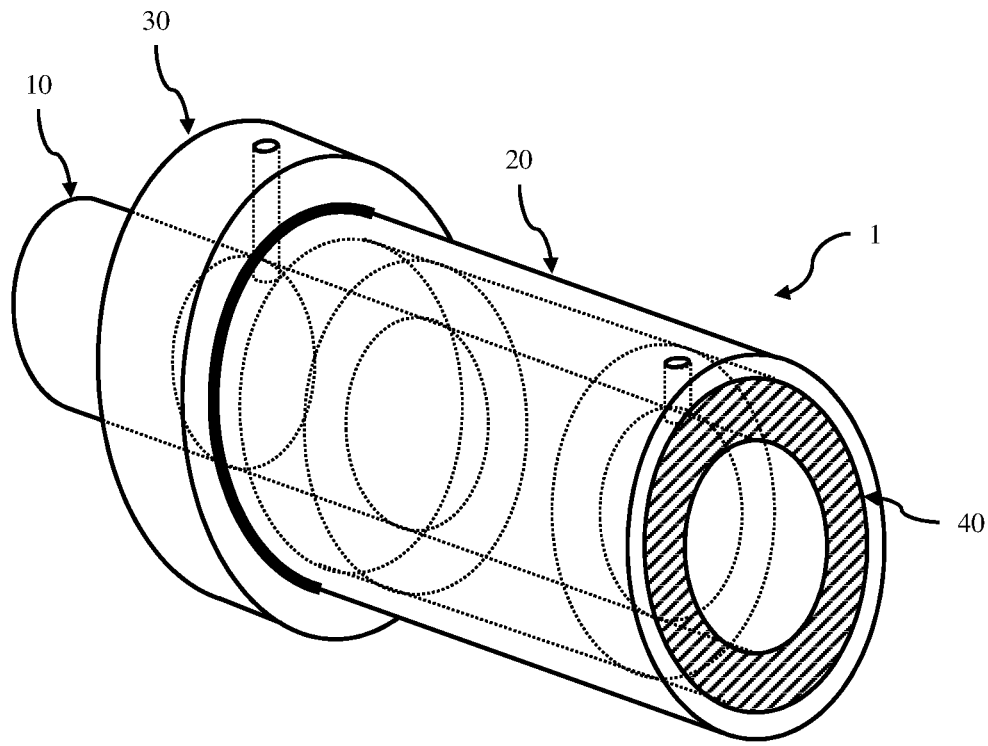
FIG. 1A is an isometric view of an encasing apparatus for encasing meat products in a double casing shown in an unloaded state according to an embodiment.
Figure 1B:
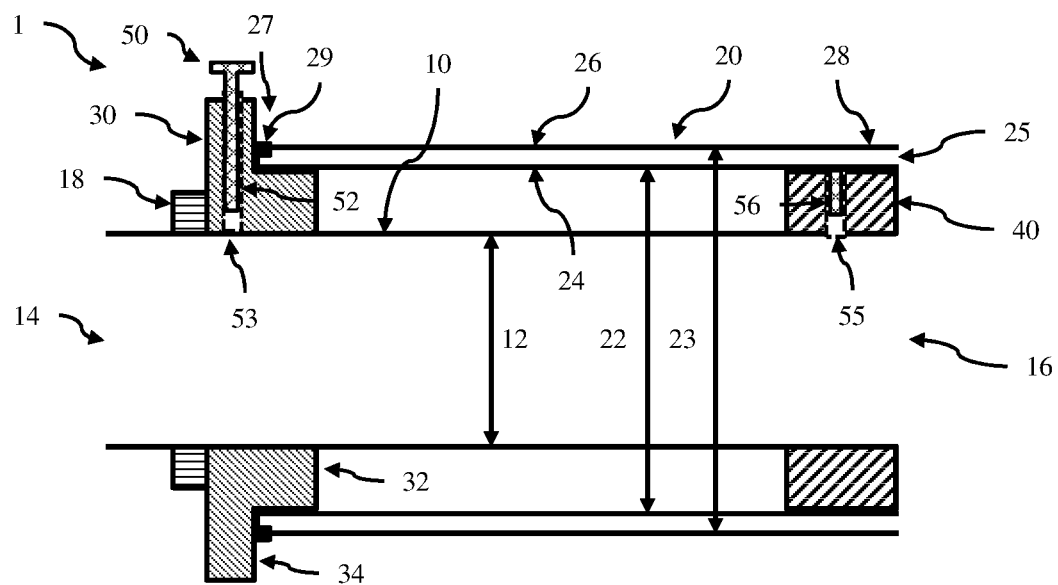
FIG. 1B is a side sectional view of the encasing apparatus of FIG. 1A in the unloaded state according to an embodiment.
Figure 1C:
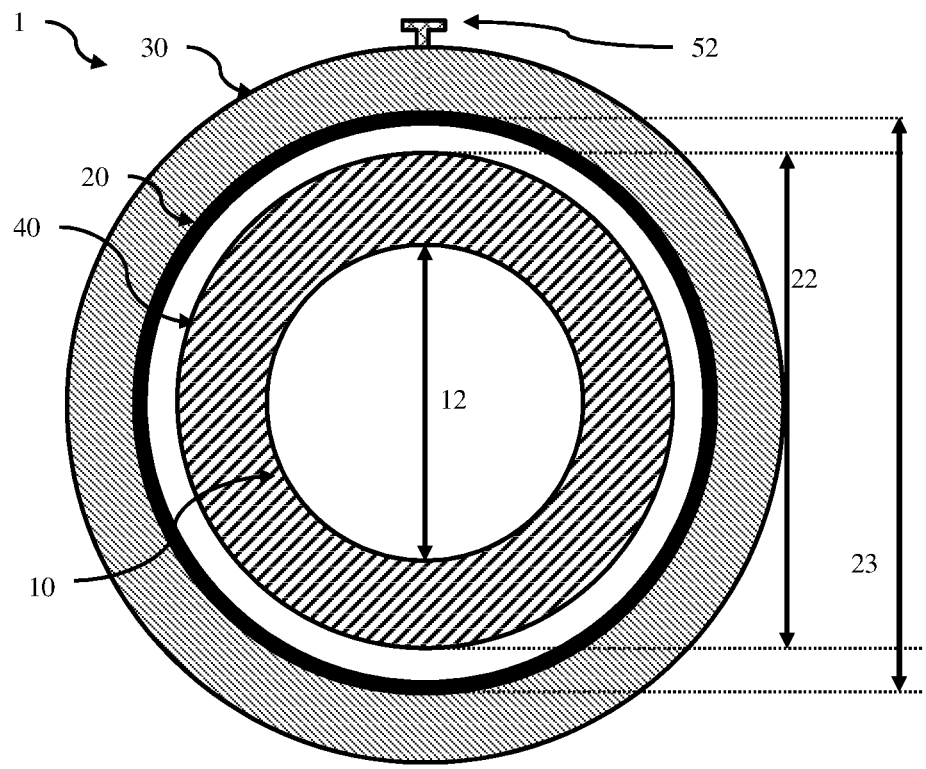
FIG. 1C is an end view of the encasing apparatus of FIG. 1A in the unloaded state according to an embodiment.
Figure 1D:
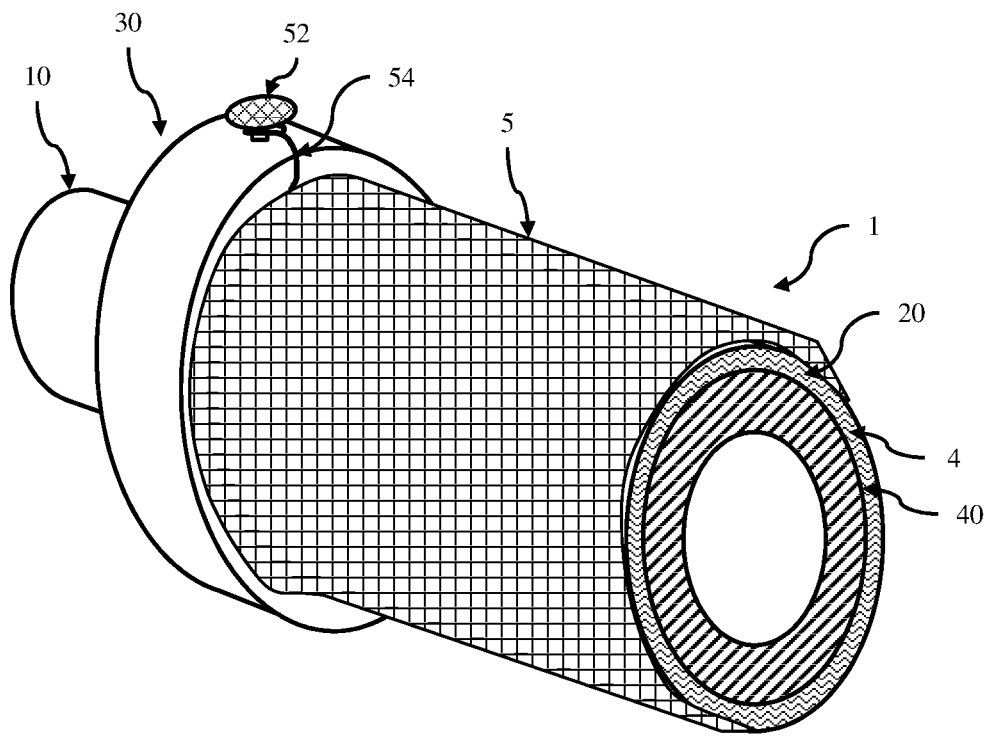
FIG. 1D is an isometric view of the encasing apparatus of FIG. 1A loaded with a shirred film and a shirred net according to an embodiment.
Figure 1E:
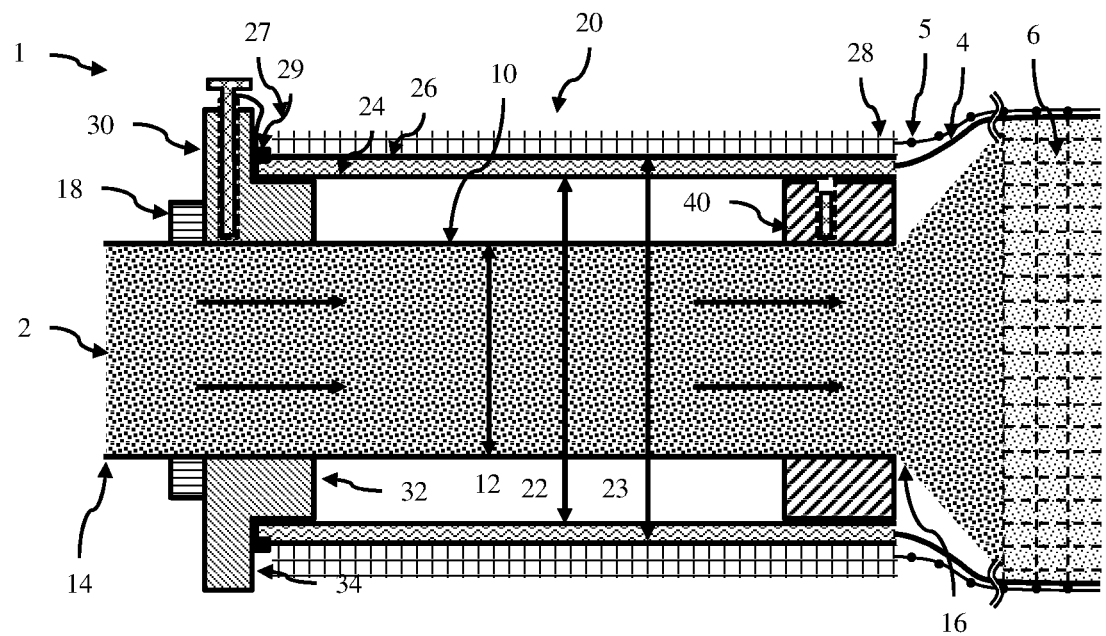
FIG. 1E is a side sectional view of the loaded encasing apparatus of FIG. 1D according to an embodiment.
Figure 1F:
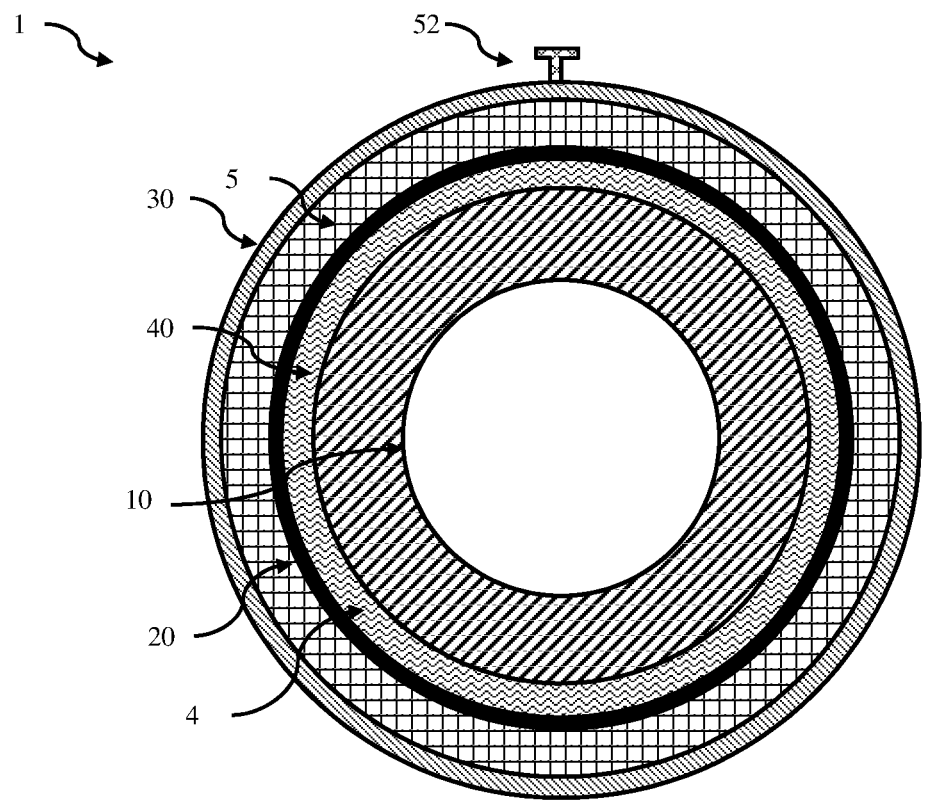
FIG. 1F is an end view of the loaded encasing apparatus of FIG. 1D according to an embodiment.

Referring now to FIGS. 1A to 1F, there is shown various views of double tube encasing apparatus 1 for encasing meat products 2 in a double casing 6 comprising a film 4 and a net 5 according to an embodiment. FIGS. 1A, 1B and 1C respectively show an isometric view, a side view and end view of the encasing apparatus in an unloaded state. FIGS. 1D, 1E and 1F respectively show an isometric view, a side view and end view of the encasing apparatus in the loaded state. Various embodiments are discussed herein which enable a reduction in the normal height of the shirred collagen, enabling the use of nettings with diameters substantially smaller than the normal height of the shirred collagen, for example for double casing small diameter meat products. FIGS. 2A to 2E illustrate the steps in assembling and loading the encasing apparatus with a shirred casing and net to induce a height reduction in the shirred casing according to a first embodiment. FIGS. 2F to 2I illustrate the steps in assembling and loading the encasing apparatus with a shirred casing and net to induce a height reduction in the shirred casing according to a second embodiment. FIGS. 3A to 3C illustrate another embodiment that can be used to induce a height reduction in the shirred casing.

The encasing apparatus 1 comprises a meat stuffing horn 10 and a double casing tube arrangement 20 supported by a first annular spacer 30 and a second annular spacing 40. The meat stuffing horn has a first diameter 12 and comprises a first end 14 through which meat is stuffed or pushed, and a meat outlet end 16. Additionally tube end locating element 18, which in this case is a flange 18 provided on the exterior of the meat stuffing tube to acts as a stop. However in other embodiments the tube end locating element could be a guard or shield, or simply be a mark, line or etching on the tube to indicate the location or point along the tube that the first end 14 should be located at. In this embodiment the meat stuffing horn has a constant diameter from the flange 18 to the meat outlet end 16 but in other embodiments this first diameter 12 could vary along the length of the horn.

The double casing tube arrangement 20 (which will also be referred to as the casing arrangement) has a first end 27 and a casing outlet end 28 and comprises a first casing tube 24 with a second diameter 22 co-axially mounted over the meat stuffing horn 10. In use the first casing tube supports a height reduced shirred film 4, such as a collagen based film. A second casing tube 26 is co-axially mounted over the first casing tube with a third diameter 23 that is larger than the second diameter 22, and is used to support a shirred or rucked net 5. As noted for the sake of convenience the term shirred will be used to describe both shirred casings and rucked nettings). The shirred (or rucked) net may be a rigid net or an elastic net, such as net comprising rigid longitudinal threads with transverse elastic threads to allow radial expansion and create a checkerboard pattern on the meat product, or to provide mechanical strength to the casing. In use, extrusion of meat product 2 from the meat outlet end 16 of the meat stuffing horn 10 pulls off (de-shirrs) both the height reduced shirred film 4 and net 5 from the casing tubes to create a double casing 6 around a meat product 2. As shown in FIG. 1D, the extruded meat forces expansion of the combined collagen casing and netting to an expanded size (or diameter) to double case the meat product. The final diameter will depend upon the properties of the netting and casing. In some embodiments the netting either does not increase in diameter from the diameter on the second casing tube 26, or only undergoes a slight increase in diameter such as to the shirred height of the netting when de-shirred. The inner casing may have a larger diameter than the netting and bulge outwards between gaps in the netting under pressure from the stuffed meat.

The first casing tube and second casing tube define an annular space 25 in which the first casing tube 24 forms the inner wall of the annular space and the second casing tube 26 forms the outer wall of the annular space 25. As shown in FIGS. 1D to 1F, the height reduced shirred film 4 is located in this annular space and supported by the first casing tube 24 and the shirred elastic net 5 is located on and supported by the outer wall of the second casing tube 26. In this embodiment the shirred elastic net is not covered, but in other embodiments a further tube could be co-axially mounted around the second tube to protect or cover the elastic net 5. Shirring of the film casing and shirring of the netting onto the second casing tube can be performed before the casing tubes are loaded onto the encasing apparatus 1. Loading of the double tube arrangement with the height reduced shirred film and shirred netting may be performed immediately before use, or the loading operation may be performed ahead of time, and the loaded double tube arrangement shipped and/or stored for later use. In another embodiment, the first casing tube is loaded with the shirred film casing, and the second casing tube is placed over the first casing tube. The shirred film may be in a height reduced form when the second casing tube is placed over the first casing tube, or placement of the first casing tube may induce a height reduction as discussed below. This partially loaded double tube arrangement, loaded with a height reduced shirred film, is stored and/or shipped in this partially loaded state. At the encasing site, netting is shirred onto the second casing tube of the partially loaded double tube arrangement and the fully loaded double tube arrangement is fitted over a meat stuffing horn for use.

In one embodiment the first casing tube 24 (the inner tube) has a diameter in the range of 40 mm to 100 mm, and the second casing tube 26 (the outer tube) has a diameter in the range of 60 mm to 160 mm. Tube wall thicknesses are in the range of 0.5 to 5 mm and can be constructed of plastic or metal materials sufficient to support the film or net shirred onto the tube. In the case of the second (outer) tube 26, the tube needs to have sufficient strength to support the netting so that it doesn't crush or compress the casing on the first tube 24 (in the annular space 25). This is particularly important when elastic nettings are used. The length of the of first and second tubes are typically in the range of 400 mm to 1000 mm, with sizes around 600 mm typically used. The length of the first and second tubes need not be the same size. For example the first support tube could have a length of 525 mm and the second support tube could have a length of 600 mm. One collagen product is provided as 50 m of shirred collagen on a 600 mm tube which equates to a packing density of 50 m/0.6 m=83 metres (unshirred) per metre of tube. Other variations in packing density are possible by controlling the shirring operation.

Various mounting arrangements may be used to co-axially mount the double casing tube arrangement 20 over the meat stuffing horn 10. In this embodiment the mounting arrangement comprises a first annular spacer 30 for supporting and spacing the first casing tube 24 from the meat stuffing tube 10 at the first end of the casing tube 27, and a second annular spacer 40 for supporting and spacing the first casing tube 24 from the meat stuffing tube at the casing outlet end 28 of the casing tube 24. The first annular spacer 30 has an L shaped profile and comprises a support portion 32 that supports and spaces the first casing tube 24 from the meat stuffing horn 10, and a stop portion 34 extending radially from the support portion 32 to act as a stop when the casing arrangement is inserted over the meat stuffing horn. To mount the second casing tube 26 coaxially over the first casing tube 24, the first end 27 of the first casing tube 24 comprises an outward radially directed flange ending in an axially directed socket 29 for receiving the first end 27 of the second casing tube 26. The second casing tube 26 can be configured to clip into the socket 29. In other embodiments the socket 29 could be located on or recessed within the stop portion 34. In another embodiment a first and second socket could be located in the stop portion 34 to receive the first and second casing tubes respectively.

In this embodiment the fastening arrangement 50 is further adapted to secure the first annular spacer 30 to the meat stuffing horn 10. The first shaft 53 is a partially threaded radial shaft through the annular spacer, and the T shaped fastener 52 comprise a matching threaded shaft portion so that the fastener can be screwed into, or at least frictionally engage the tube 20 and thus secure the first annular spacer in place around the tube 20. A loop 54 is connected to the first end 27 of the double casing tube arrangement 20 and once the double casing tube arrangement casing tube is in place, the loop is placed around the shaft of the T shaped fastener 52 to fasten the tube in place over the spacers 30, 40 and meat stuffing horn 10. A similar arrangement is provided in the second annular spacer comprising a second shaft 55 and a second fastener 56. In this embodiment as the shaft is located below the tube 20, the height of the fastener is selected so that when fastened to the tube, the fastener is fully recessed within the shaft. In other embodiments multiple (e.g. 2, 3 or 4) shafts and screws could be provided to assist in fastening the first and second annular spacers to the tube at a desired location. These fastening arrangements allow the spacers to be located at any desired location along the meat stuffing horn and then fastened in place. The meat stuffing horn may comprise one or more location indicators or locating arrangements to facilitate fastening at desired locations. For example an outer shoulder could be placed in the meat outlet end of the meat stuffing horn, and the lower edge of the second annular spacer could comprise of a projection which engages with the shoulder so that the shoulder acts a stop against further insertion of the second annular spacer 40. Alternatively a mark could be placed or etched on the tube or a recess could be provided in the outer surface of the meat stuffing horn to receive the fastener (which in this case could be a pin).

FIG. 1E is a side view of the encasing apparatus of FIG. 1A in use. Prior to use, the casing arrangement 20 is pre-loaded with shirred film 4 on the first casing tube 24 (i.e. inner wall of casing arrangement 20) and shirred elastic net 5 on the second casing tube (i.e. outer wall of the casing arrangement 20) and placed over the meat stuffing tube. Meat product 2 is then pushed or stuffed into the first end 14 of the meat stuffing horn 10 through which it passes before exiting at the meat outlet 16. As the meat product 2 is extruded from the meat stuffing tube, the movement of the meat pulls off and expands the film 4 and net 5 to double case 6 the extruded meat product. This encased meat product is then separated into portions for later processing (e.g. heating/cooking or curing) and storage. The double casing assists in providing a desired shape (e.g. a sausage shape) or surface pattern, as well as assisting in preserving and protecting the meat product during these processes and during storage. Various films 4, both edible and inedible may be used as the first film layer, and various netting arrangements included rigid and elastic nettings may be used to assist in applying compression to exclude air and/or provide an aesthetically pleasing surface texture. The film may be a be edible or inedible collagen films, fibrous casing, carrageenan films, cellulose films, paper films, polyamide films, polysaccharide films, synthetic films, or a close knit woven fabric or mesh film. In applications where the film will remain on the product to the point of sale, then edible films such as edible collagen based films have clear benefits over inedible films as consumers do not need to remove the film prior to eating the product.

The diameter of the netting threads may vary from low Denier (small diameter) threads to thick high Denier rope like threads, for example 300 Denier to 2400 Denier. In many cases the thickness (Denier size) of threads will be much larger than the film thickness. Thickness affects the shirring process and thus if there is a larger variation in the thickness of the netting threads compared to film thickness, the shirring densities, that is the amount of unshirred product per unit length, can be quite different. Thus for a fixed length tube, as the film is much thinner, the length or amount of the shirred film can be much longer/greater than the amount of shirred netting that can be packed on the same length.

During use the film and netting are pulled or de-shirred/derucked off the casing arrangement and the meat filling force expansion of the film and netting casing. Shirring of the film 4 and net 5 onto the respective first and second casing tubes is performed in order to reduce the number of times the production process needs to be stopped (or paused) to allow an empty casing arrangement to be replaced with a loaded pre-shirred replacement casing arrangement. As mentioned above edible films and in particular collagen based films are typically fragile and difficult to work with.

Collagen casings easily tear if they are subjected to excessive stress or force in the shirring or de-shirring process resulting in wastage of the collagen, film, netting, meat product and operator time. In prior art arrangements the collagen film is produced and stored in a preshirred tubular form with a large fold height, which is then placed over the meat stuffing horn. However as discussed above this prevents use of this arrangement with small diameter nets. Alternatively the collagen film is shaped from a flat sheet to form a circular casing that is provided with longitudinal folds to allow radial expansion (i.e. an increase in the diameter) of the collagen casing. However one problem with the use of longitudinal folds is that collagen is delicate and can be sticky (especially when wet), and so that as the folds expand to increase the radius, the two sides of a fold can catch on each other preventing free expansion of the fold. Accordingly FIGS. 2A to 2G illustrate the steps in assembling and loading the encasing apparatus illustrated in FIGS. 1A to 1D with a height reduced shirred casing 4 and net 5 which facilitates use with small diameter nets without subjecting the collagen film to excessive stress or effects which adversely affect the failure rate.

Figure 2A:
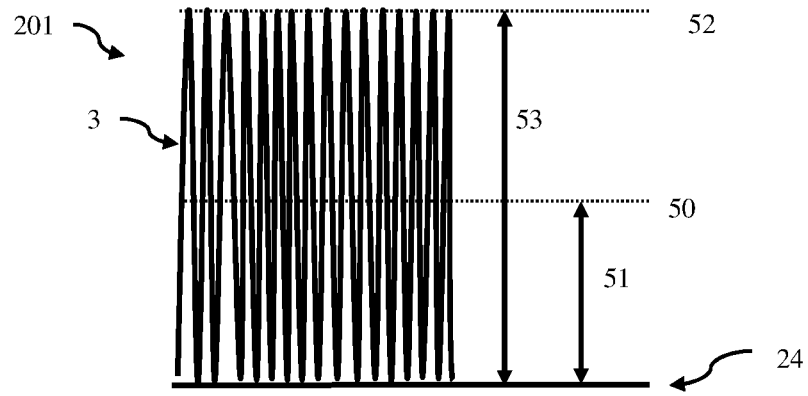
FIG. 2A is a side sectional view of a prior art tightly shirred film loaded on a first casing tube.
Figure 3A:
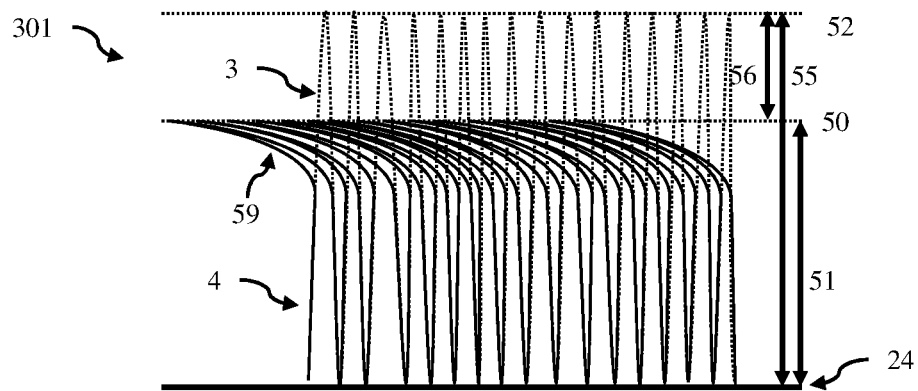
FIG. 3A is a side sectional view of a curved over shirred film loaded on a first casing tube according to an embodiment.
Figure 3B:
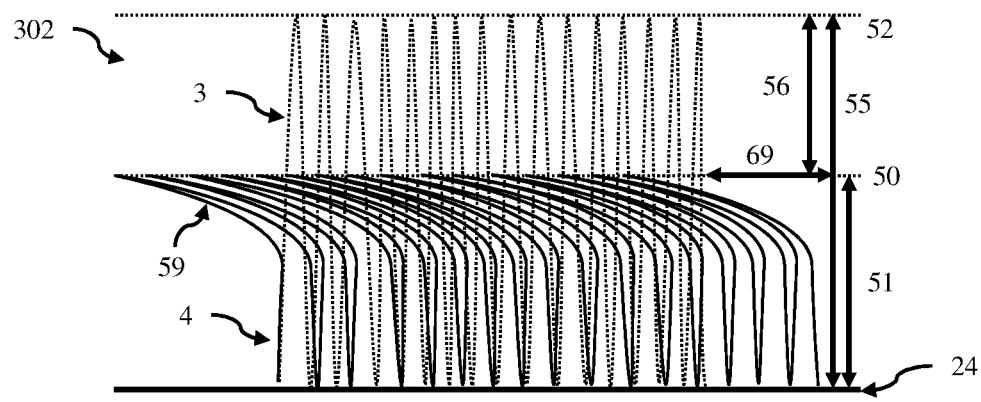
FIG. 3B is a side sectional view of a curved over shirred film loaded on a first casing tube according to another embodiment.
Figure 3C:
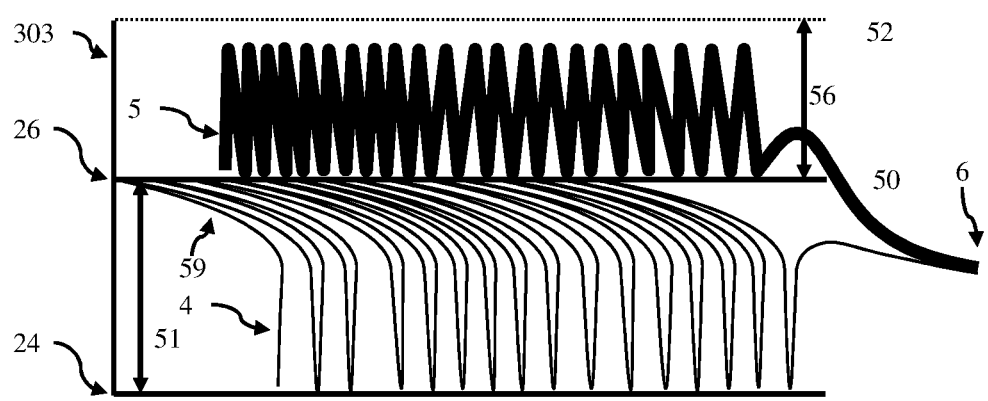
FIG. 3C is a side sectional view of double tube arrangement with a curved over shirred film loaded on a first casing tube according to an embodiment.

Referring to FIG. 2A, there is shown a side view 201 of a prior art tightly shirred film 3 loaded on a first casing tube 24. First dotted reference line 50 indicates the height 51 of the second tube wall 26 with respect to the first casing tube. This corresponds to the radial height of the annular space 25, and is effectively the diameter of the second tube. Second dotted reference line 52 indicates the height 53 or wall thickness of the tightly shirred collagen film 3 above the first casing tube and it can clearly be seen that the height or thickness of the tightly shirred collagen film is significantly greater than the height of the annular space 51.

Figure 2B:
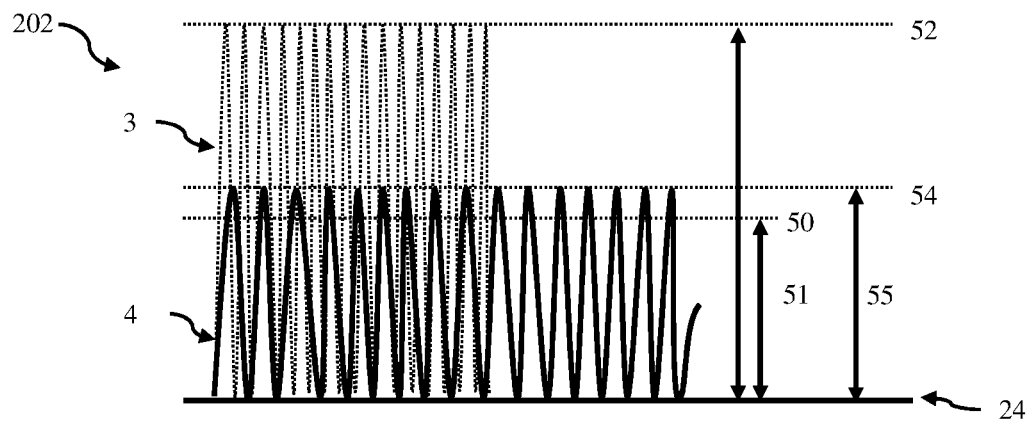
FIG. 2B is a side sectional view of a loosely shirred film loaded on a first casing tube according to an embodiment.

FIG. 2B shows a side view 202 of an embodiment which uses a loosely shirred film 4 loaded on a first casing tube 24 in a first configuration with a first height 55 according to an embodiment. In this context loose implies that the number of folds per unit length is reduced so that the length of collagen shirred onto the first casing tube is also reduced compared to the arrangement in FIG. 2A. The top surface or wall thickness of the loosely shirred film is indicated by third dotted reference line 54. The loosely shirred collagen film 4 has a smaller height 55 or wall thickness and is less axially compressed (less folds per unit length) than the tightly shirred collagen film (shown in dotted form in FIG. 2B) to allow use with smaller diameter nettings than can be used with previous tightly shirred films 3. In this first configuration the shirred collagen film 4 has a larger wall height 55 than the radial height of the annular space 25 but is dimensioned or shirred so that placement of the second casing tube over the first casing tube induces a reduction in the height of the loosely shirred film 4 so that when in the loaded configuration (i.e. second tube placed over the first tube) the wall thickness or height of the shirred film 4 is less than or equal to the annular spacing 25. This can be achieved by reducing the number of folders per unit length (i.e. loosely shirring) and/or controlling the dimensions (e.g. using a reduced height)

Figure 2C:
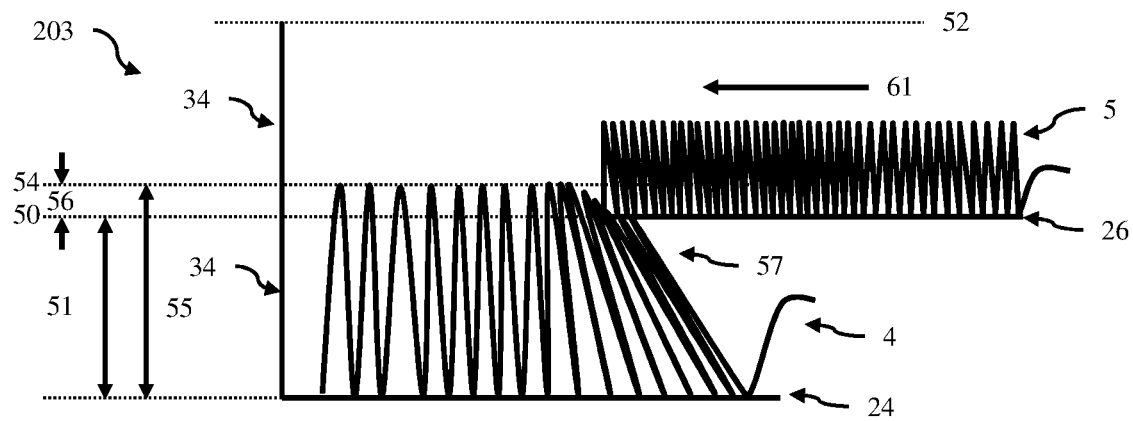
FIG. 2C is a side sectional view of a second casing tube being slid over the first casing tube to deflect the loosely shirred film shown in FIG. 2A.
Figure 2D:
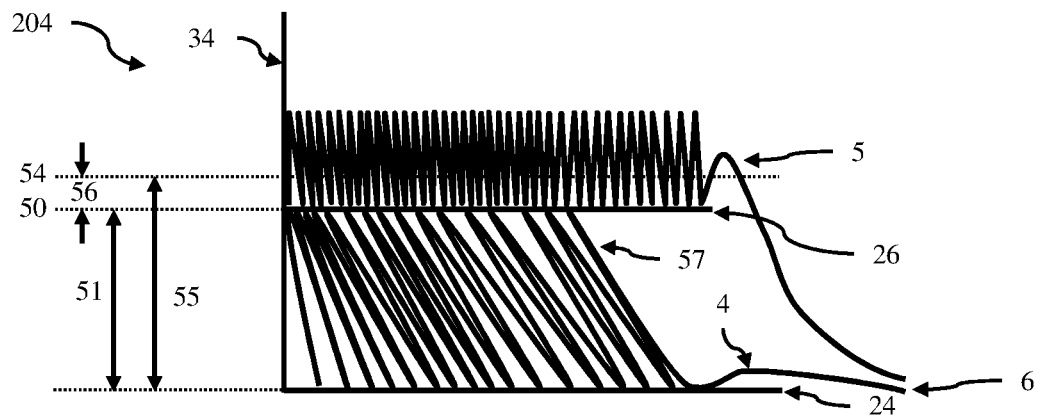
FIG. 2D is a side sectional view of a second casing tube placed over the first casing tube illustrating the loosely shirred film shown in FIG. 2A in a laid back configuration.
Figure 2E:
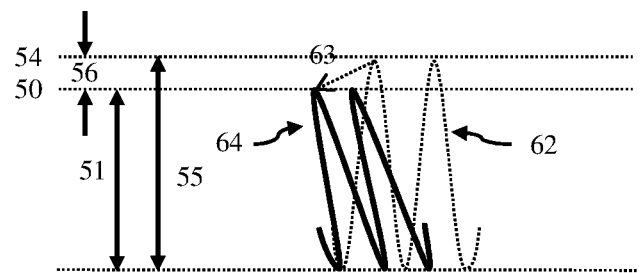
FIG. 2E is a profile view of a portion of the loosely shirred film shown in FIGS. 2A to 2C illustrating the original and laid back configurations.

FIGS. 2C to 2E illustrate a first embodiment for achieving a reduction in height during placement of the second casing tube 26 over the first casing tube 24. In this embodiment the reduction in height is generated by the insertion or sliding action of the second casing tube 26 over the first casing tube 24. FIG. 2C is a side sectional view 203 of a second casing tube 26 being slid over the first casing tube 24 toward the stop 34 as indicated by arrow 61. In this embodiment the second casing tube 26 is preloaded with shirred netting 5, although in other embodiments shirring of the netting on the second casing tube could be performed after placement of the second casing tube over the first casing tube. The height 51 of the second casing tube 26 with respect to the first casing tube is less than the first height 52 of the height reduced shirred film 4 and is indicated by dotted line 50. Putting it another way, the diameter 23 of the second casing tube is less than the sum of the diameter 22 of the first casing tube and the first height 55 of the height reduced shirred film in the first configuration. As the second casing tube is placed over the first casing tube the height reduced shirred film 4 is deflected towards the stop 34 and forced to adopt a laid back configuration 57 due to the reduced height of the second casing, indicated by height difference 56.

FIG. 2D is a side sectional view 204 of a second casing tube after placement over the first casing tube illustrating the height reduced shirred film 4 shown in FIG. 2A has adopted a laid back configuration (or loaded configuration). FIG. 2E is a profile view of a portion of the height reduced shirred film 5 shown in FIGS. 2B to 2D illustrating the original 62 and laid back 64 configurations, with movement of a fold of the film 4 indicated by arrow 63. It can thus be seen that placement of the second casing tube 26 over the first casing tube 24 induces a reduction in the height of the height reduced shirred film 4 by a height difference 56. This also achieves some axial compression of the height reduced shirred film.

Figure 2F:
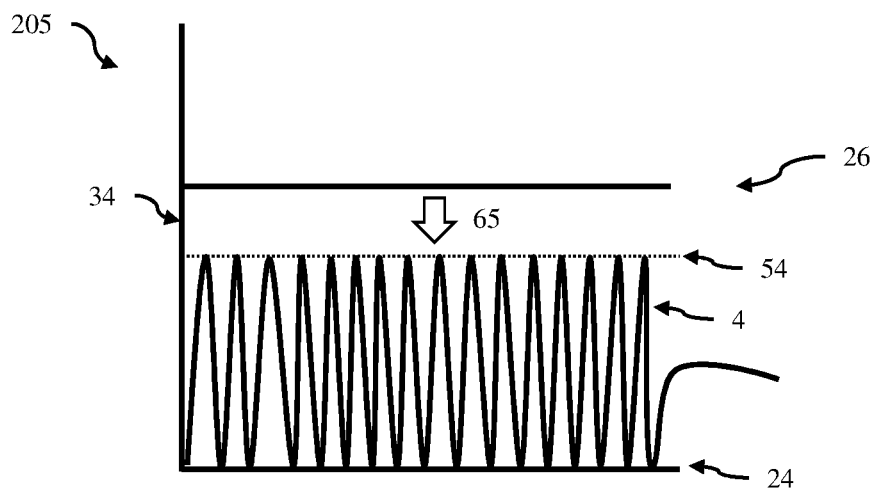
FIG. 2F is a side sectional view of an outer wall being brought towards a loosely shirred film loaded on a first casing tube according to an embodiment.

FIGS. 2F to 2I illustrate a second embodiment for achieving a reduction in height during placement of the second casing tube 26 over the first casing tube 24. FIG. 2F is a side sectional view 205 of an outer wall 26 of a casing arrangement 20 being brought radially towards a shirred film loaded on a first casing tube 24 according to another embodiment, as indicated by arrow 65. That is the diameter of the second tube is variable and gradually reduced. In one embodiment this is achieved by wrapping a flat flexible sheet around the first casing tube to form a cylindrical tube, and then moving one end past the other end to reduce the diameter and gently compress and reduce the height of the shirred folds of the film 4. This is illustrated in FIG. 2F, which is a side sectional view 206 of the outer wall 26 at second (final) height 51 (indicated by dotted reference line 50) over the first casing tube 24 illustrating the reduction in height 56 of the height reduced shirred film 4 due to the height reduced shirred film adopting a compressed configuration 58.

Figure 2G:
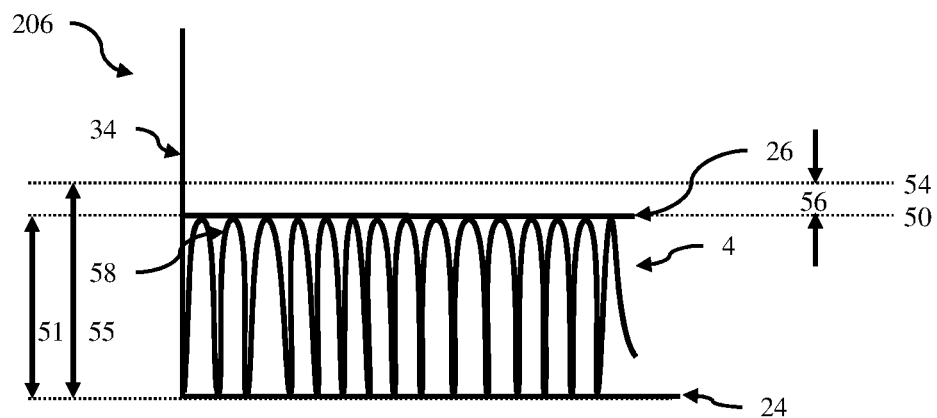
FIG. 2G is a side sectional view of the outer wall in a final position to compress the loosely shirred film shown in FIG. 2A into a compressed configuration.
Figure 2H:
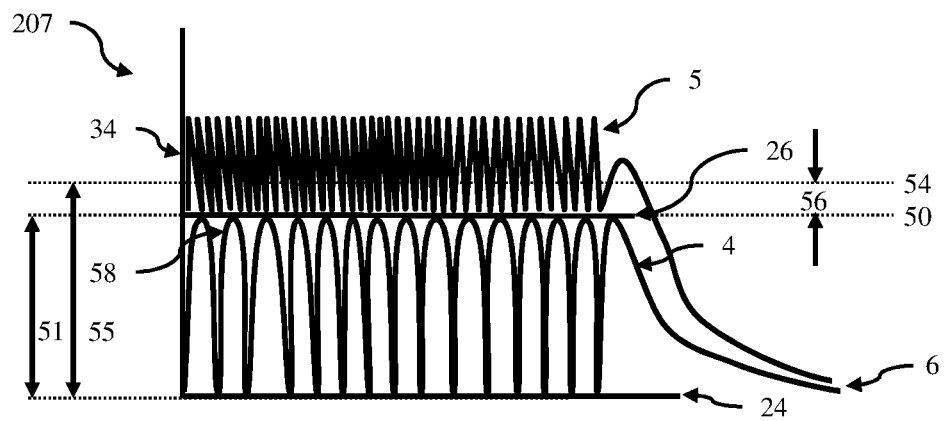
FIG. 2H is a side sectional view of the outer wall loaded with a shirred net placed over the first casing tube illustrating the loosely shirred film shown in FIG. 2A in a compressed configuration.
Figure 2I:
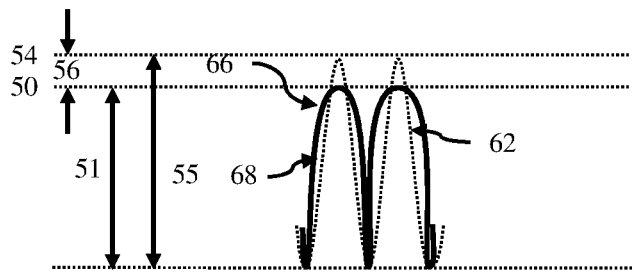
FIG. 2I is a profile view of a portion of the loosely shirred film shown in FIGS. 2F to 2H illustrating the original and compressed configurations according to an embodiment.

Once the diameter of the second casing tube 24 has been reduced to the required amount the ends can be fixed with respect to each other and a net 5 is shirred over the second casing tube 26. FIG. 2H is a side sectional view 207 of the outer wall 26 in which the second casing tube is now shown loaded with a shirred net 5. FIG. 2I is a profile view of a portion of the height reduced shirred film 4 shown in FIGS. 2F to 2G illustrating the original 63 and radially compressed configurations 68. As illustrated in FIG. 2I the fold of the film 4 has increased curvature in the top portion of the film to accommodate the reduction 56 in height 55. Again it can thus be seen that placement of the second casing tube 26 over the first casing tube 24 induces a reduction in the height of the height reduced shirred film 4 by a height difference 56.

The above two embodiments illustrate two ways through which the reduction in height can be achieved. However it is to be understood this are illustrative and other variations and methods can be utilised to induce the reduction 56 in the height of the shirred film 4. For example the nettings can be shirred after the second casing tube is placed over the first casing tube. Additionally a third tube or cover may be placed over the loaded second casing tube to protect the shirred netting. The double tube arrangement can loaded and stored as a single replacement unit for attachment to a meat stuffing horn (e.g. to replace a used double tube arrangement), or the loaded first casing tube and loaded second casing tube may be separately stored, and each tube replaced independently on a needs basis. More generally a method of double casing a meat product 2 exiting a meat stuffing horn 10 comprises:

placing a first casing tube 24 over a meat stuffing horn 10 having a first diameter 12;

loading a shirred film 4 on the first casing tube 24, the shirred film having a first height 55;

placing a second casing tube 26 over the first casing tube 24 wherein placement of the second casing tube 26 causes a reduction 56 in the height of the shirred film 4 to a second height 51;

loading a shirred net 6 on the second casing tube 26;

forcing a meat product 2 through the meat stuffing horn 10; and double casing 6 the meat exiting the meat stuffing horn 10 by de-shirring the film 4 and net 5 exiting the first casing tube 24 and the second casing tube 26.

In the embodiments illustrated in FIGS. 2B to 2I, the film is shirred at a lower density, that is less pleats or folder per unit length, and has a smaller vertical height 55 compared to the vertically shirred film shown in FIG. 2A which has a height 53. These methods can be used to induce significant height reductions. However in some embodiments where the height reduction in the film is not required to be large, the shirring density and vertical height could be the same as that of the film shown in FIG. 2A in which case the height 55 is equal to height 53.

FIGS. 3A to 3C illustrate another embodiment that can be used to induce a height reduction in the shirred casing. In this embodiment the height reduction is performed during or after shirring, and before placement of the second casing tube 26, by curving over or laying back the top portion 59 of the shirred collagen 4. This is illustrated in FIG. 3A which is a side sectional view 301 of a curved over shirred film loaded on a first casing tube 26. As can be seen in FIG. 3A, the film is initially approximately vertical and then has a curved over portion 59 to give the film a curled over wave like shape. This also creates a region of overhang at one end. Typically the film will be deshirred from the non overhanging end (the right hand end in FIG. 3A—see FIG. 3C). For reference the shirred film 3 of FIG. 2A is shown in dotted form to indicate the full height shirred film as indicated by first height 53. In this embodiment the height reduced shirred film 4 has the same number of folds per unit length as the reference shirred film 3. That is there is no reduction in the length (or amount) of shirred film, only a reduction in height 56 to a second (or reduced) height 51 which is less than or equal to the inner diameter of the second support tube. In some embodiments the height could be slightly larger and as the second tube is pushed over a further height reduction achieved, for example as illustrated in the embodiment shown in FIGS. 2C to 2E.

Curving over of the shirred film can be performed during the shirring operation or after shirring. In one embodiment the shirring machine comprises a mandrel and a pair of shirring wheels (or knuckles) located above and below the mandrel. The shirring wheels are located at a proximal end of the mandrel and a supply of cylindrical casing at the distal end of the mandrel (for example on a roll). A first end of the supply of the cylindrical casing is inserted or fed onto the distal end of the mandrel and pulled towards the proximal end of the mandrel and secured so the casing is between the surface of the mandrel and the shirring wheels. The shirring wheels are formed as paddle wheels of flexible plastic or rubber paddles (or teeth) and are located above and below the mandrel. When switched on, the shirring wheels rapidly rotate and the paddles (or teeth) engage and pull the casing to form vertical pleats or folds (known as shirring). As the shirred casing builds up the shirring wheels gradually move from the proximal to distal end. By controlling the rotation rate and rate of movement along the mandrel axis the shirring density can be controlled. The shirred casing can be cut to length and shipped. In one embodiment the support tube is the mandrel. In another embodiment the casing is shirred onto the mandrel, and then removed. It may then be shipped in shirred form and placed directly on the stuffing horn or placed on a support tube which is then mounted over the stuffing horn. In another embodiment the shirred casing is removed from the mandrel and placed on a support tube for shipping (and this is then mounted over the stuffing horn). In one embodiment 50 meters of collagen film is shirred onto 600 mm of support tube.

In one embodiment the curved over profile is obtained by selecting the shape/geometry of the paddles on the shirring wheels. In one embodiment the curved over profile is generated by grouping consecutive blades, which each successive blade in the group have a larger size to increase the push over. In another embodiment the profile of the blade is curved. In another embodiment a shaping block with the desired curve profile is placed at the distal end of the mandrel. Shining begins at the shaping block such that the shaping block supports the film as it is shirred on in order to shape the shirred film. As additional film is shirred on, this is supported by the existing shirred film which has the desired curved over profile, and thus the curved over profile is maintained (or propagated) over the axial length of the shirred collagen. Alternative arrangements could be used to induce the desired shape or profile during shirring, such as a using an annular shaper that engages and pushes over each fold of the collagen as it is shirred onto the first tube 26. In another embodiment the curved over shape shaping is formed after shirring. In this embodiment collagen is shirred onto the mandrel or casing tube for example as shown in FIG. 2A. Then an annular shaping tool is pushed over the shirred collagen to push over the top portion of the collagen. In one embodiment the film may be treated to make it more flexible to assist in shaping the film.

In the embodiment shown in FIG. 3A, the folds or pleats are substantially vertical for the first half to two thirds and then begin to curve, and there is no reduction in the length (or amount) of shirred film. That is the number of folds or pleats per unit length is maintained. To obtain large height reductions, and thus smaller outer diameter shirred films, the number of folds or pleats per unit length may be reduced. FIG. 3B shows another embodiment in which a greater reduction in height 56 is achieved compared to the height reduction shown in FIG. 3A, by reducing the number of folds/pleats per unit length (the shirring density), and initiating curvature at a lower height (for example after the first third of the unshirred pleat height (i.e. height 51 is approximately ⅓ of height 53 in this embodiment)

In these embodiments the pleats begin as substantially vertical pleats from the support tube 24, and then at some distance from the support tube begin to curve over to form a curved portion 24. That is the top of the pleat has a curved wave like profile. The height at which the curvature begins can be varied depending upon the amount of height reduction required. For example the curved over portion may be the top quarter, third, half or two thirds. Generally there is a trade-off between packing density (number of folds or pleats per unit length) and the height reduction that can be achieved. The exact relationship will depend upon the diameter of the first support tube 24 (the inner diameter of the shirred film 4) and the second tube 26 (the outer diameter of the height reduced shirred film—that is height 51 with respect to the first support tube 24).

FIG. 3C is a side sectional view of double tube arrangement with a curved over shirred film 4 and a shirred netting 5 loaded on a first casing tube according to an embodiment. In this embodiment the shirred netting is a thick netting (i.e. large Denier) compared to the thickness of the film. As the stuffing operation proceeds the height reduced shirred collagen is pulled off along with the shirred netting to form a double casing. The previous method can be generalised to a method of double casing a meat product 2 exiting a meat stuffing horn 10 comprising:

loading a shirred film casing 4 onto a first casing tube 24 having a first height 55;

placing a second casing tube 26 loaded with a shirred netting 5 coaxially over the first casing tube 24;

forcing a meat product 2 through the meat stuffing horn 10 and double casing 6 the meat exiting the meat stuffing horn 10 by de-shirring the film and netting exiting the first casing tube 24 and the second casing tube 26, wherein either the film casing 5 is shirred to have a height reduced profile 59, or placing the second casing tube 26 over the first casing tube 24 induces a reduction in the height 56 of the shirred film to a second height 51.

The step of loading a shirred film casing onto a first casing tube may comprise shirring a film casing directly onto the first casing tube, or shirring the film casing onto a mandrel and loading the shirred film casing onto the first casing; and placing the first casing tube loaded with the shirred film over a meat stuffing horn having a first diameter. The method may also comprise shirring (or rucking) a netting onto the second casing tube 26, or shirring a netting onto a mandrel and loading the shirred netting onto the second casing tube 26. The meat stuffing horn may be the first casing tube and the step of loading a shirred film casing onto a first casing tube may comprise obtaining a shirred film casing and placing the shirred film over a meat stuffing horn having a first diameter.

The film casing may be shirred with a height reduced profile compared to the height if the film was substantially vertically shirred. The height reduced profile may be a curved over profile in which the shirred film has a substantially vertical portion followed by a curved over portion 59 so that the shirred film has a height 51 which is less than the height of the equivalent vertically shirred film 55. The method may additionally include shirring netting onto an additional second casing tube 26 and replacing the second casing tube 26 with this additional second casing tube loaded with shirred netting. This replacement operation can be performed as the second casing tube runs out, or is about to run out of shirred netting.

This arrangement enables the use of nettings which are 5%-30% smaller in diameter than the film to give indentation (surface patterning) to meat product. This is not possible with standard shirring method. That is, a 150 mm diameter casing cannot be shirred with an outer diameter of 150 mm as the netting it has been matched with has a diameter of 135 mm to provide a pattern on the meat when stuffed. In this embodiment the casing is shirred having a curved, wave face, like profile that allows it to be height reduced (or shirred down in diameter).

In one embodiment the first casing tube 24 has 77 mm inner diameter with a 1 mm wall thickness (i.e. shirred film has an inner diameter of 78 mm) and the second casing tube has an inner diameter of 133 mm with 1 mm wall thickness. The initial height of the collagen is 150 mm and is shirred down to a reduced height of 133 mm (outer diameter—equivalently a height reduction 56 of 17 mm or 11%). A 133 mm inner diameter plastic support tube 26 with 1 mm wall thickness was then placed over the shirred collagen and the netting loaded onto the first support tube 24. This second plastic tube provides support to the netting. This is particularly important when using elastic nettings to ensure they do not crush the casing. A 135 mm diameter netting was shirred onto the 133 mm diameter second tube 26. In another embodiment the first casing tube 24 has 77 mm inner diameter with a 1 mm wall thickness (i.e. shirred film has an inner diameter of 78 mm) and the second casing tube has an inner diameter of 108 mm with 1 mm wall thickness. The initial height of the collagen is 125 mm and is shirred down to a reduced height of 108 mm (outer diameter—equivalently a height reduction 56 of 17 mm or 13%) and can be used with a 135 mm diameter netting. In other embodiments the inner tube diameter can vary between 40 mm and 100 mm and the outer tube diameter can vary between 60 mm and 160 mm.

In other embodiments the netting can also be the same size as the collagen if patterning (indentation) on the meat product is not desired. The netting can act purely as a strength enhancer to the film casing to ensure it does not burst or rip during filling, cooking or hanging of the meat product.

As discussed above, in many applications the thickness of the film is much smaller than the thickness (i.e. Denier size) of the netting—for example the netting may have a Denier size of 1000-2000. Additionally the unadjusted vertical height of each pleat in the film may be greater than that of the netting (see the examples above). This is particularly true in surface patterning/indentation applications where the expanded diameter of the netting is less than that of the collagen. In such cases the length (or amount of shirred collagen) may be greater (longer) than length of the shirred netting (per unit length). In many cases with thick nettings this difference will be substantial. In such cases, and in order to limit the number of reloading operations required the amount of netting shirred onto the second tube may be limited so that the ratio of the length of the height reduced shirred film to the length of the shirred netting is an approximately integer ratio such as 1:2 or 1:3. That is the length of the shirred film casing is an integer multiple of the length of the shirred netting such as 2, 3, 4 or 5 times. For example in one embodiment a 100 metre length of collagen is could be shirred on the first support tube, and 50 metre length of thick netting is shirred onto the second support tubes (i.e. 1:2 or collagen length two times netting length). Once the first netting runs out, the stuffing operation is paused, and the now empty second support tube is removed and replaced with another second support tube loaded with 50 m of shirred netting. The stuffing operation is restarted and the film and netting will then run out at approximately the same time, and in this case the now empty first and second support tube are replaced with further first and second support tubes loaded with shirred film and collagen respectively.

Often the cost per metre of the film is often much higher than the cost per metre of the netting, and thus in some embodiments the total length of netting shirred onto the second support tube(s) 26 is selected to be 1-10% more than the length of film shirred onto the first support tube 24. That is rather than an exact ratio of 1:1 or 1:2 the actual ratios could be 1:1.01 to 1.11 or 1:2.01 to 1:22—i.e. the length of the shirred film casing is in the range of 1% times an integer multiple of the length of the shirred netting to 10% time an integer multiple of the length of the shirred netting. Providing excess netting ensures that when on the last load of netting in the case of integer loadings (e.g. second of a 1:2 ratio, third of a 1:3 ratio), the film will always run out first, and that there will be only be a small wastage of netting. Where multiple (n) netting tubes 26 are used for each film tube 24 (i.e 1:n ratio where n>1), the additional netting can be equally divided between each of the n netting tubes, or all of the excess netting on one of the n tubes (for example the last) or arbitrarily assigned between the n tubes. In one embodiment all of the excess netting is shirred onto one of the tubes. For example for a 100 m length of shirred film, 101 m to 110 m of shirred netting. In the case of 1:2 ratio and a 10% excess this could be provided as two 55 m shirred netting tubes, or a 50 m shirred netting tube an a 60 m shirred netting tube. There is typically a small amount of wastage of netting involved with a tube change over—for example 200 mm, and so using 1-10% larger nettings will typically ensure that the film runs out first taking into account this wastage. For example with a 100 m length of film, a 1% excess corresponds to 1 m (=5×200 mm), so with two netting tubes 26 each with 50.5 m length of shirred netting, or even four netting tubes 26 each with 25.25 m lengths of shirred netting the film is likely to run out before the last netting tube runs out.

In the above embodiments the casing is shirred or loaded onto a first casing tube which is inserted over the meat stuffing horn. In other embodiments the meat stuffing horn 12 is used as the first casing tube. In these embodiments the casing is inserted directly over the meat stuffing horn and then the second tube is mounted over the meat stuffing horn. In this embodiment the shirred casing may be a height reduced casing or placement of the second tube may induce the height reduction.

Various other embodiments can also be used. The ability to store and ship a double tube pre-loaded with a shirred film and net casing, or separate loaded first 24 and second 24 tubes allows use with a wide range of equipment and/or products. For example the same loaded double tube casing arrangement could be used with different apparatus having different length and/or different diameter meat stuffing horns. In the case of the different length horns, the same spacers can be used and only the location of the spacers needs to be modified. In the case of a different diameter horn, then spacing with different internal diameters are required, or spacer with a variable internal diameter could be used. For example a retractable inner wall or supports could be used. In the embodiments illustrated the spacers are solid annular spacers, but other arrangements could be used. In one embodiment the spacers need not be solid but composed of support members linked to support the casing tube. For example a hub and spoke arrangement could be used in which the hub sits on the stuffing horn and the spokes support the casing tube, or a rim and spoke arrangement could be used in which the rim supports the casing tube and the spokes extend down to the meat stuffing horn to support the rim. In another embodiment the spacer need not span 360° (i.e. not have a circular profile) and instead only span a smaller amount sufficient to support the casing tube such as 270°, 235°, 180° or even less if multiple spacers are used and offset with respect to each other to provide sufficient support to the casing tube.

Using the above embodiments, or similar variations, smaller meat products can be double cased using both shirred collagen film and shirred netting loaded onto a double tube arrangement. Through the use of a height reduction techniques such as loosely shirred films which are height reduced, shirring the film in a height reduced form (e.g. the curved over or wave like profile), or reducing the height of the shirred film by curving it over after vertical shirring (so that it adopts a curved over of wave like profile), film can be efficiently shirred without subjecting the film to excessive stress so that the failure rate is not adversely affected. This is a particular issue with many films, such a collagen films which are expensive (per unit length) and difficult to work with. Reducing the height of the shirred collagen also overcomes the previous limitation that shirred collagen films could only be used with larger diameter nettings, and the embodiments described herein in open up patterning applications for small diameter meat products (e.g. 60-160 mm diameter), where the diameter netting is required to be 5-30% smaller than the diameter of the casing to ensure indentation (patterning) of the meat, or in other small diameter non patterning applications where netting diameter is required to be similar to the film diameter, and thus increases the range of meat products that can be double cased using shirred films, including collagen films, and nets.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An encasing apparatus for encasing meat products extruded from a meat stuffing horn having a meat outlet end in a double casing comprising film casing and a net casing, the encasing apparatus comprising:
   a first casing tube co-axially mountable over the meat stuffing horn, the first casing tube supporting a shirred film, wherein the shirred film has a height reduced profile with a first height;
   a second casing tube co-axially mountable over the first casing tube, the second casing tube supporting a shirred netting.

2. The encasing apparatus as claimed in claim 1, wherein the shirred film is shirred onto the first casing tube with a curved over profile comprising a substantially vertical portion and a curved over portion, such that the height of the shirred film is reduced compared to the height if the film was substantially vertically shirred.

3. The encasing apparatus as claimed in claim 1, wherein the film is shirred onto the first casing tube with a first height, and in use, placement of the second casing tube over the first casing tube induces a reduction in the height of the shirred film to a second height.

4. The encasing apparatus as claimed in claim 3, wherein the first casing tube has a first diameter, and the second casing tube has a second diameter, and the difference between the second diameter and the first diameter is less than the first height of the shirred film.

5. The encasing apparatus as claimed in claim 1, wherein the shirred film is a collagen film.

6. The encasing apparatus as claimed in claim 1, wherein the first casing tube has a first end and a casing outlet end and the encasing apparatus further comprises a mounting arrangement for co-axially mounting the first casing tube over the meat stuffing horn, the mounting arrangement comprising:
  a first annular spacer for supporting the first casing tube from the meat stuffing horn at the first end of the casing tube, the first annular spacing comprising a support portion that supports and spaces the casing tube from the meat stuffing horn, and a stop portion extending radially from the support portion to act as a stop when inserting the casing tube over the meat stuffing horn;
  a second annular spacer for supporting the first casing tube from the meat stuffing horn at the casing outlet end of the casing tube.

7. The encasing apparatus as claimed in claim 1, wherein the first casing tube has a diameter in the range 40 mm to 100 mm and the second casing tube has a diameter in the range of 60 mm to 160 mm.

8. The encasing apparatus as claimed in claim 1, wherein a diameter of the shirred film is between 5%-30% smaller than a diameter of the shirred netting.

9. The encasing apparatus as claimed in claim 1, wherein the length of the shirred film is approximately an integer multiple of the length of the shirred netting.

10. The encasing apparatus as claimed in claim 9, wherein the length of the shirred film is in the range of 1% times an integer multiple of the length of the shirred netting to 10% time an integer multiple of the length of the shirred netting.

11. A method of double casing a meat product exiting a meat stuffing horn, the method comprising:
  loading a shirred film onto a first casing tube having a first height;
  placing a second casing tube loaded with a shirred netting coaxially over the first casing tube;
  forcing a meat product through the meat stuffing horn and double casing the meat exiting the meat stuffing horn by de-shirring the film and netting exiting the first casing tube and the second casing tube,
  wherein either the film is shirred to have a height reduced profile or placing the second casing tube over the first casing tube induces a reduction in the height of the shirred film to a second height.

12. The method as claimed in claim 11, wherein the step of loading a shirred film onto a first casing tube comprises:
  shirring a film directly onto the first casing tube, or shirring the film onto a mandrel and loading the shirred film onto the first casing tube;
  placing the first casing tube loaded with the shirred film over a meat stuffing horn having a first diameter.

13. The method as claimed in claim 12, wherein the film is shirred with a height reduced profile compared to the height if the film was substantially vertically shirred.

14. The method as claimed in claim 13, wherein the shirred film has a substantially vertical portion followed by a curved over portion.

15. The method as claimed in claim 12, wherein the step of placing a second casing tube over the first casing tube comprises sliding the second casing tube over the first casing tube from a casing outlet end towards a first end and the sliding action deflects at least an outer portion of the shirred film towards the first end to force the shirred film to adopt a laid back configuration.

16. The method as claimed in claim 11, wherein the step of placing a second casing tube over the first casing tube comprises sliding the second casing tube over the first casing tube from a casing outlet end towards a first end and the sliding action deflects at least an outer portion of the shirred film towards the first end to force the shirred film to adopt a laid back configuration.

17. The method as claimed in claim 11, wherein the first casing tube has a diameter in the range 40 mm to 100 mm and the second casing tube has a diameter in the range of 60 mm to 160 mm.

18. The method as claimed in claim 11, wherein a diameter of the shirred film is between 5%-30% smaller than a diameter of the shirred netting.

19. The method as claimed in claim 11, wherein the length of the shirred film is approximately an integer multiple of the length of the shirred netting.

20. The method as claimed in claim 19, wherein the length of the shirred film is in the range of 1% times an integer multiple of the length of the shirred netting to 10% time an integer multiple of the length of the shirred netting.

21. The method as claimed in claim 11, wherein the shirred film is a collagen film.

* * * * *